United States Patent
Suzuki et al.

(10) Patent No.: US 10,666,095 B2
(45) Date of Patent: May 26, 2020

(54) POWER SUPPLY DEVICE, COMMUNICATION TERMINAL DEVICE, AND NON-CONTACT POWER TRANSMISSION METHOD

(71) Applicant: Sony Mobile Communications Inc., Tokyo (JP)

(72) Inventors: Katsuya Suzuki, Tokyo (JP); Kuniharu Suzuki, Tokyo (JP)

(73) Assignee: SONY CORPORATION, Tokyo (JP)

(*) Notice: Subject to any disclaimer, the term of this patent is extended or adjusted under 35 U.S.C. 154(b) by 224 days.

(21) Appl. No.: 15/848,181

(22) Filed: Dec. 20, 2017

(65) Prior Publication Data

US 2018/0115199 A1 Apr. 26, 2018

Related U.S. Application Data

(63) Continuation of application No. 15/054,804, filed on Feb. 26, 2016, now Pat. No. 9,912,380, which is a
(Continued)

(51) Int. Cl.
| | |
|---|---|
| *H04W 52/28* | (2009.01) |
| *H04W 4/00* | (2018.01) |
| *H04B 5/00* | (2006.01) |
| *H02J 7/02* | (2016.01) |
| *H02J 5/00* | (2016.01) |
| *H02J 7/00* | (2006.01) |
| *H02J 50/80* | (2016.01) |
| *H02J 50/12* | (2016.01) |
| *H04W 4/80* | (2018.01) |
| *H02J 7/34* | (2006.01) |

(52) U.S. Cl.
CPC .............. *H02J 50/80* (2016.02); *H02J 5/005* (2013.01); *H02J 50/12* (2016.02); *H04B 5/0037* (2013.01); *H04B 5/0081* (2013.01); *H04W 4/80* (2018.02); *H04W 52/281* (2013.01); *H02J 7/0027* (2013.01); *H02J 7/342* (2020.01)

(58) Field of Classification Search
None
See application file for complete search history.

(56) References Cited

U.S. PATENT DOCUMENTS

| | | | |
|---|---|---|---|
| 7,696,718 B2 | 4/2010 | Suzuki | |
| 7,750,508 B2 | 7/2010 | Kato et al. | |
(Continued)

FOREIGN PATENT DOCUMENTS

JP 2006-353042 12/2006

*Primary Examiner* — Jared Fureman
*Assistant Examiner* — Aqeel H Bukhari
(74) *Attorney, Agent, or Firm* — Xsensus LLP

(57) ABSTRACT

A power supply apparatus including a near-field wireless communication unit that wirelessly communicates with a plurality of communication terminals, a power transmission unit that sets a plurality of resonance frequencies to transfer power in a non-contact manner to each of the plurality of communication terminals, and a control unit that determines a priority level of each of the communication terminals based on identification information received from the communication terminals and determines an amount of power transmitted at each of the resonance frequencies based on the determined priority levels.

19 Claims, 7 Drawing Sheets

Related U.S. Application Data continuation of application No. 14/471,946, filed on Aug. 28, 2014, now Pat. No. 9,300,146, which is a continuation of application No. 13/078,624, filed on Apr. 1, 2011, now Pat. No. 8,853,890.

(60) Provisional application No. 61/362,723, filed on Jul. 9, 2010.

(56) References Cited

U.S. PATENT DOCUMENTS

| | | |
|---|---|---|
| 2008/0197802 A1 | 8/2008 | Onishi et al. |
| 2008/0197804 A1 | 8/2008 | Onishi et al. |
| 2008/0207239 A1* | 8/2008 | Fuji .................. H04W 16/14 455/512 |
| 2009/0079387 A1 | 3/2009 | Jin et al. |
| 2012/0007441 A1* | 1/2012 | John .................. A61N 1/3785 307/104 |
| 2013/0278209 A1 | 10/2013 | Von Novak, III |
| 2014/0117772 A1 | 5/2014 | Karaoguz |

* cited by examiner (EXAMPLE WHERE CHARGING MEMBER NUMBER JKn = 0 OR 1 AND CHARGING NON-MEMBER NUMBER JHKn = 0 OR 2)

(EXAMPLE WHERE CHARGING MEMBER NUMBER JKn = 3 AND CHARGING NON-MEMBER NUMBER JHKn = 2)

(EXAMPLE WHERE CHARGING MEMBER NUMBER JKn = 2 AND CHARGING NON-MEMBER NUMBER JHKn = 3)

POWER SUPPLY DEVICE, COMMUNICATION TERMINAL DEVICE, AND NON-CONTACT POWER TRANSMISSION METHOD

CROSS REFERENCE TO RELATED APPLICATION

This application is a continuation of U.S. Ser. No. 15/054,804, filed Feb. 26, 2016, which is a continuation U.S. Ser. No. 14/471,946, filed Aug. 28, 2014, now U.S. Pat. No. 9,300,146, which is a continuation of U.S. Ser. No. 13/078,624, filed Apr. 1, 2011, now U.S. Pat. No. 8,853,890; the entire contents of which is incorporated herein by reference. U.S. Ser. No. 13/078,624 claims the benefit of priority under 119(e) of U.S. Provisional Application Ser. No. 61/362,723 filed on Jul. 9, 2010.

BACKGROUND

1. Field of the Disclosure

The present invention relates to, for example, a power supply device that can be appropriately used to charge a terminal provided with a wireless communication function, such as a mobile telephone terminal device, a communication terminal device charged through the use of power transmitted from the power supply device, and a non-contact power transmission method used for the power supply device.

In recent years, power has been transmitted from a device such as a charger to a different terminal device in a non-contact state where a power supply end or the like is not connected to the different terminal device to charge a secondary battery provided in the different terminal device.

An electromagnetic induction scheme has been available as a non-contact power transfer scheme of related art. According to the electromagnetic induction scheme, a power transmission coil is provided in the power transmission-side device and a power reception coil is provided in the power reception-side terminal device. Then, the part where the power transmission coil of the power transmission-side device is provided is brought near to that where the power reception coil of the power reception-side device is provided to produce the magnetic flux coupling between the power transmission coil and the power reception coil so that the power transmission is attained in a non-contact manner.

For example, a power transmission coil 11 is provided in a terminal device 10a and a power reception coil 12 is provided in a terminal device 10b as illustrated in FIG. 8. Then, the power transmission coil 11 of the terminal device 10a is brought near to the power reception coil 12 of the terminal device 10b as illustrated in FIG. 8 so that power is transmitted from the power transmission coil 11 to the power reception coil 12.

The terminal device 10b provided on the power reception-side can use the transmitted power to charge a secondary battery provided in the terminal device 10b. Otherwise, the terminal device 10b can use the transmitted power as operation power thereof.

The electromagnetic induction scheme is a non-contact power transfer technology that has been widely used. However, under the electromagnetic induction scheme, power can be transferred over a distance of the order of few millimeters so that power can be transferred between devices that are significantly close to each other. At present, therefore, the electromagnetic induction scheme has been used for some devices including, for example, a waterproof terminal with a charging end that can be exposed with difficulty.

On the other hand, in recent years, a so-called magnetic resonance scheme has been developed and put to practical use as a scheme for efficiently transmitting power to a terminal device provided at some distance in a non-contact manner. Namely, an LC circuit including a coil, a capacitor, and so forth is provided in each of the power transmission-side device and the power reception-side device to establish the electric field-and-magnetic field resonance between both the LC circuits so that the wireless power transfer is achieved. Frequencies that are used to establish the electric field-and-magnetic field resonance between both the LC circuits should be equivalent to each other.

Under the magnetic resonance scheme, the near-field power transfer can be performed over a distance of the order of few centimeters to few meters. Further, when a plurality of the power reception-side devices is provided in a power transferable range, power can be transferred from a single power transmission-side device to the power reception-side devices at one time.

For example, three terminal devices 20a, 20b, and 20c are provided in the neighborhood of one another as illustrated in FIG. 9. The terminal device 20a includes a magnetic resonance-power transmission coil 21 and each of the terminal devices 20b and 20c includes a magnetic resonance-power reception coil 22. The two terminal devices 20b and 20c are provided in a power transfer range Ap defined for the terminal device 20a.

When the resonance frequencies of the three terminal devices 20a, 20b, and 20c are equivalent to one another in that state, power can be transferred from the single terminal device 20a to the two terminal devices 20b and 20c at one time. However, compared to the power transmitted to the single terminal device, the power transmitted to each of the terminal devices 20b and 20c is reduced by half or around so long as the configuration of the terminal device 20b is equivalent to that of the terminal device 20c.

Japanese Unexamined Patent Application Publication No. 2006-353042 discloses the following technology. Namely, for charging a terminal device in a non-contact manner, the terminal device is identified through near-field communications or the like, and the identified terminal device is charged.

SUMMARY OF THE INVENTION

For performing the power transfer under the magnetic resonance scheme, a relatively large power transfer range can be set and power can be transferred to each of terminal devices having the power reception coil at one time, the terminal devices being provided in the power transfer range, as illustrated in FIG. 9. However, since the power is transferred to each of the terminal devices that are provided in the power transfer range for charging, the power transmitted to each of the terminal devices is reduced with an increase in the number of the terminal devices that are provided in the power transfer range. Consequently, the amount of power transferred to each of the terminal devices is not so large.

For example, even though power should be transferred from the terminal device 20a illustrated in FIG. 9 to the terminal device 20b alone and no power should be transferred to a different terminal device provided in the same power transfer range Ap, that is, the terminal device 20c, the power is unintendedly transmitted from the terminal device 20a to the terminal device 20c. Consequently, the power transmitted to the terminal device 20b falls short of expectations.

FIG. 9 illustrates the example where the power is transferred between the terminal devices. However, the same effect is obtained even though the transmission source is a power supply device provided as a charger.

Accordingly, the present invention has been achieved to solve the problems occurring when charging power is transmitted through the non-contact power transfer.

The present invention is used to transfer power in a non-contact manner under the magnetic resonance scheme to a communication terminal device including a near-field wireless communication unit.

Accordingly to one exemplary embodiment, the disclosure is directed to a power supply apparatus including a near-field wireless communication unit that wirelessly communicates with a plurality of communication terminals, a power transmission unit that sets a plurality of resonance frequencies to transfer power in a non-contact manner to each of the plurality of communication terminals, and a control unit that determines a priority level of each of the communication terminals based on identification information received from the communication terminals and determines an amount of power transmitted at each of the resonance frequencies based on the determined priority levels.

Thus, it becomes possible to set priority related to the non-contact power transfer based on the registration state or the like of communication terminal devices that are provided near a single power supply device and transfer a large amount of power to a terminal device of which set priority is high.

The present invention allows for setting the power distribution priority based on the registration state of each of communication terminal devices, transmitting high power to a communication terminal device with high priority, and transmitting low power to a communication terminal device with low priority. Consequently, it becomes possible to set different power transmission states for communication terminal devices that are provided in a range where the power can be transmitted to the communication terminal devices at one time.

DESCRIPTION OF THE PREFERRED EMBODIMENTS

Hereinafter, an embodiment of the present invention will be described with reference to the attached drawings in the following order.

1. Exemplary configuration of Terminal device (FIG. 1)
2. Exemplary configurations of Charger (FIGS. 2 and 3)
3. Exemplary processing performed to transfer Power to Terminal device (FIGS. 4, 5, 6, and 7A, 7B, 7C, and 7D)
4. Exemplary Modifications 1. Exemplary Configuration of Terminal Device In a system according to an embodiment of the present invention, a charger base which is a magnetic resonance non-contact power transmission device transmits power to nearby communication terminal devices so that each of the nearby communication terminal devices is charged.

First, the configuration of a communication terminal device provided as a power reception-side device according to an embodiment of the present invention will be described with reference to FIG. 1.

Figure 1:
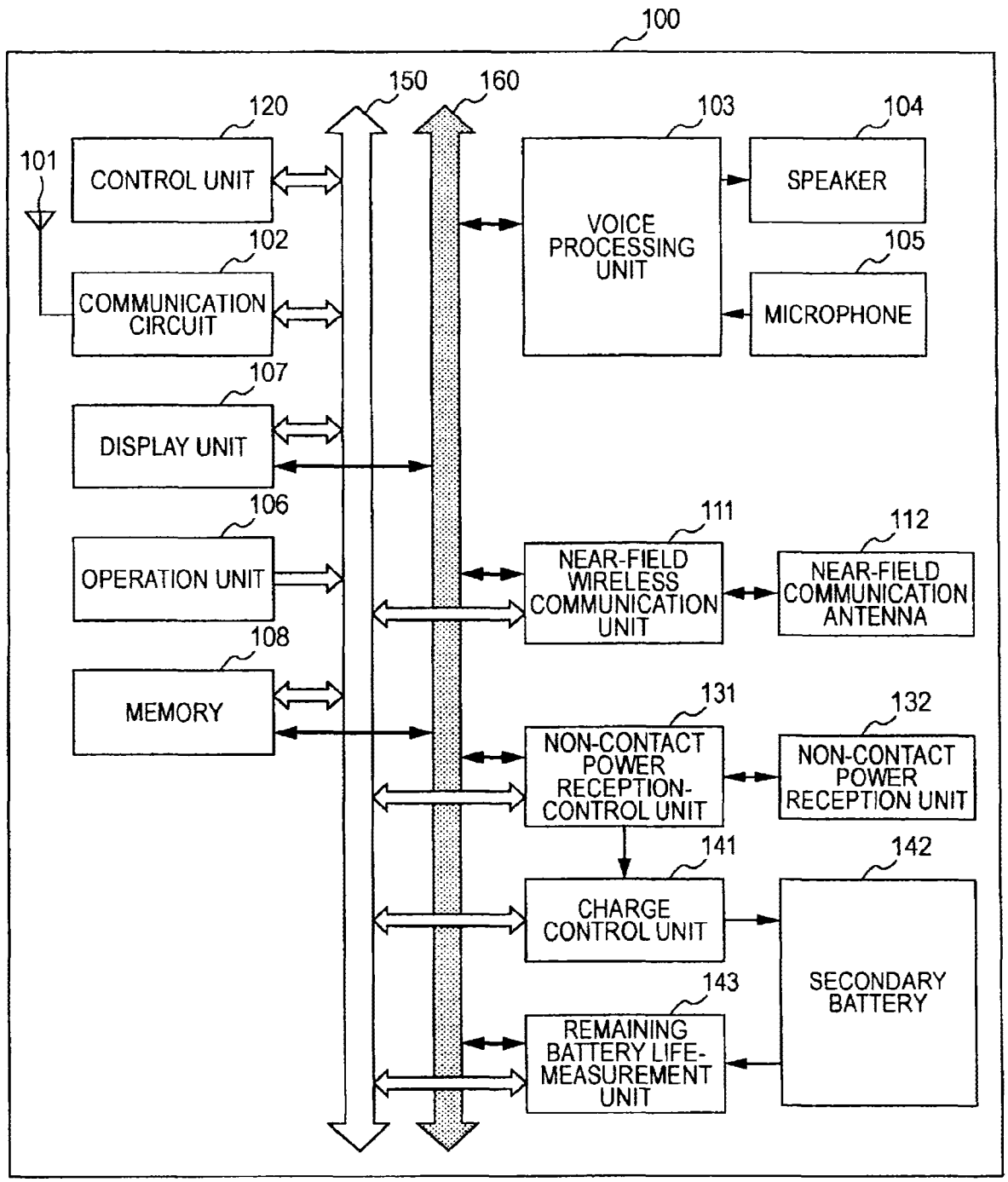
FIG. 1 is a block diagram illustrating an exemplary configuration of a terminal device according to an embodiment of the present invention.

FIG. 1 is a block diagram illustrating an exemplary internal configuration of a communication terminal device 100 according to an embodiment of the present invention. The above-described communication terminal device 100 is a wireless telephone terminal device which is portable and small in size.

The configuration illustrated in FIG. 1 will be described. According to the communication terminal device 100, an antenna 101 provided for a wireless telephone is connected to a communication circuit 102 provided as a wireless communication unit. The communication circuit 102 wirelessly communicates with a wireless telephone-base station under the control of a control unit 120.

When a voice call is made, voice data included in data transmitted to the communication circuit 102 is transmitted to a voice processing unit 103 so that the voice data is decoded and an analog voice signal is obtained. The obtained voice signal is transmitted and externally transmitted from a speaker 104.

Further, a voice signal picked up through a microphone 105 is transmitted to the voice processing unit 103. The voice processing unit 103 encodes the transmitted voice signal in predetermined voice data. The obtained voice data is transmitted to the communication circuit 102 for wireless transmission.

Each of the above-described processing units including the communication circuit 102, the voice processing unit 103, and so forth is configured to transmit and/or receive control data to and/or from the control unit 120 or the like via a control line 150. Further, each of data items is transferred via a data line 160.

Operation data transmitted from an operation unit 106 including keys, a touch panel, and so forth that are operated by a user is transmitted to the control unit 120 executing processing according to an instruction indicated by the operation data.

The communication terminal device 100 includes a display unit 107 including an image display panel and a drive circuit provided therefor, and so forth. Data is displayed on the display unit 107 under the control of the control unit 120. The display unit 107 displays data used by the communication terminal device 100 to make an outgoing call and/or receive an incoming call as a wireless telephone terminal device. Additionally, the display unit 107 displays the data of sentences of an electronic mail for reception and/or transmission, image data or the like obtained through access to the Internet, and data obtained by executing various types of functions of the terminal device 100. The display unit 107 also provides a notification for the user at the non-contact power transfer time which will be described later under the control of the control unit 120.

A memory 108 is connected to the control unit 120 via the control line 150 and the data line 160 to store various types of data used by the communication terminal device 100 in the memory 108. A program provided to perform the non-contact power transfer that will be described later is also stored in the memory 108. Further, identification data given to each of the communication terminal devices 100 is also stored in the memory 108 and the stored identification data can be read from the memory 108.

The communication terminal device 100 includes a near-field wireless communication unit 111 configured to perform near-field communications. A near-field communication antenna 112 is connected to the near-field wireless communication unit 111. The near-field wireless communication unit 111 is a processing unit configured to wirelessly communicate with a person who is at a distance of about several meters to a hundred meters at the maximum. The near-field wireless communication can be performed through a near-field wireless system referred to as a wireless local area network (LAN), a Bluetooth (Registered Trademark) system, an infrared transfer system, and so forth.

The near-field wireless communications that are performed through the near-field wireless communication unit 111 are executed to directly transfer various types of data among a plurality of the communication terminal devices 100, for example. However, according to the above-described embodiment, the above-described near-field wireless communication unit 111 is used to communicate with a charger base 200 that will be described later.

The communication terminal device 100 further includes a processing unit configured to receive power through the non-contact power transfer. Namely, a non-contact power reception-control unit 131 is connected to the control line 150. The non-contact power reception-control unit 131 is connected to a non-contact power reception unit 132. Then, processing is performed to charge a secondary battery 142 through the use of power received by the non-contact power reception unit 132 under the control of a charge control unit 141. According to the above-described embodiment, the non-contact power reception unit 132 receives power under a magnetic resonance scheme. It is configured that a resonance frequency used when the non-contact power reception unit 132 receives power is variable. For example, it may be configured that the resonance frequency can be varied in at least two steps and/or the resonance frequency can be varied continuously. The above-described resonance frequency is set according to an instruction issued from the control unit 120.

For example, a resonance frequency is set in an initial state and a different resonance frequency can be set according to an instruction issued from the control unit 120. An example configuration provided to change the resonance frequency will be illustrated when describing the configuration of the charger base 200 that will be described later.

When the non-contact power reception unit 132 receives power, the non-contact power reception-control unit 131 transmits data of an instruction to the charge control unit 141 and charge processing is performed for the secondary battery 142 through the use of the received power. The charge control unit 141 is a processing unit provided to control charging when the communication terminal device 100 is directly connected to a charger (not shown) through the use of a cable or the like. The charge control unit 141 further controls charging executed through the use of power received by the non-contact power reception unit 132.

It is configured that the charging residual quantity of the secondary battery 142 is measured through a remaining battery life-measurement unit 143 provided to transmit data of the measured charging residual quantity of the secondary battery 142 to the control unit 120. Here, the secondary battery 142 includes, for example, a lithium ion-storage battery. However, the secondary battery 142 may include a different charging section.

2. Exemplary Configurations of Charger

Figure 2:
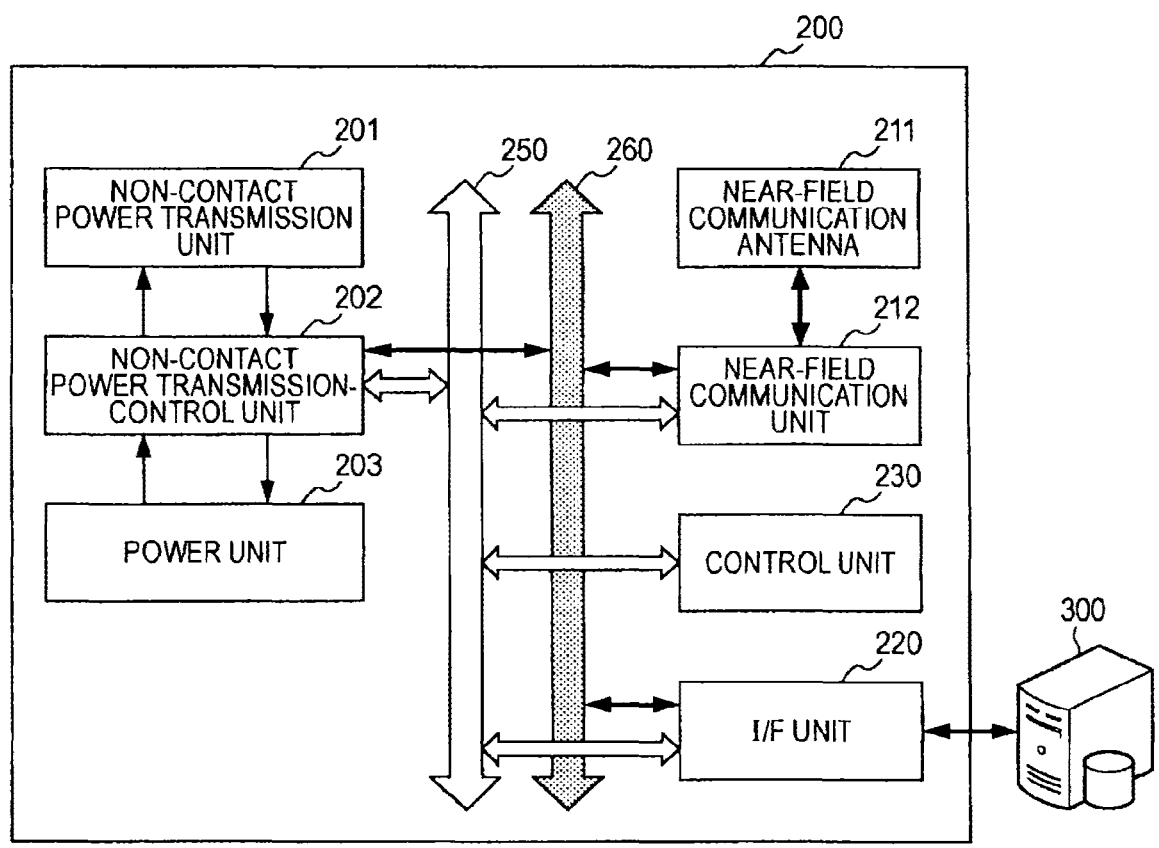
FIG. 2 is a block diagram illustrating an exemplary terminal configuration of a charger base according to an embodiment of the present invention.

Next, the configuration of a charger base provided as a power transmission device configured to transmit power to a communication terminal device in a non-contact manner will be described with reference to FIG. 2.

A charger base 200 according to the above-described embodiment is provided at a place where an indefinite number of people gathers, such as a store. It is configured that the communication terminal device 100 for charging is placed on and/or near the charger base 200. However, the communication terminal device 100 for charging may not necessarily be directly placed on the charger base 200 so long as the communication terminal device 100 is provided in a range where power transmitted from the charger base 200 can reach. In the above-described embodiment, the charger base 200 can transmit power to a plurality of the communication terminal devices 100 for charging at the same time.

The configuration of the charger base 200 will be described. The charger base 200 includes a non-contact power transmission unit 201 provided to transmit power under the magnetic resonance scheme. In that case, a resonance frequency used when the non-contact power transmission unit 201 transmits power under the magnetic resonance scheme is made variable. An exemplary configuration provided to make the resonance frequency variable will be described later.

A power unit 203 supplies power which shall be transmitted from the non-contact power transmission unit 201 and the power transmission is controlled through a non-contact power transmission-control unit 202. The power transmission control is executed through the non-contact power transmission-control unit 202 according to an instruction issued from the control unit 230. A resonance frequency set through the non-contact power transmission unit 201 is also controlled through the non-contact power transmission-control unit 202. The power unit 203 rectifies and transforms commercial alternating-current power, for example, to obtain power for transmission.

Further, it is configured that power transmitted from the power unit 203 to the non-contact power transmission unit 201 at the power transmission time is made variable. It is configured that the power is variable based on the number of the communication terminal devices 100 for charging as described later.

Further, the charger base 200 includes a near-field wireless communication unit 212 and a near-field communication antenna 211 connected to the near-field wireless communication unit 212. The near-field wireless communication unit 212 is a processing unit configured to wirelessly communicate with a person who is in a distance of the order of several meters to a hundred meters at the maximum. The same wireless communication system as that of the near-field wireless communication unit 111 provided in the above-described communication terminal device 100 is used for the near-field wireless communication unit 212. More specifically, a near-field wireless system referred to as the wireless LAN, a Bluetooth (Registered Trademark) system, an infrared transfer system, and so forth are used for the near-field wireless communication unit 212.

Then, the control unit 230 determines the state of transferring power to each of the terminal devices for performing the power transmission based on a result of wireless communications that are performed between the near-field wireless communication unit 212 and the nearby wireless communication terminal 100, and transmits data of an instruction to the non-contact power transmission-control unit 202 to perform non-contact power transmission in the determined transfer state. The details of the determined state will be described at the time of describing a flowchart of FIG. 4.

Further, it is configured that the charger base 200 includes an interface unit 220 to allow access to a member database 300 via the interface unit 220. The member database 300 stores data of a member registered on a member system developed through a person responsible for a place where the charger base 200 is provided. Namely, data used to identify a communication terminal device which is a portable telephone terminal owned by the registered member is stored in the member database 300. The above-described data used to identify the communication terminal device is acquired from each of the wireless communication terminal devices 100 when the near-field wireless communication unit 212 directly communicates with the wireless communication terminal device 100.

The member database 300 includes a computer apparatus provided with a large capacity-data storage unit, for example. It may be configured that the member database 300 is provided at a place away from the charger base 200 so that data is transmitted between the charger base 200 and the member database 300 via a network of some kind.

Further, the control unit 230 is configured to exchange control data or the like with each of internal units via the control line 250. Further, it is configured that the units that are provided in the charger base 200 exchange data with one another via a data line 260.

Next, the principles of a configuration achieved to change a resonance frequency through the non-contact power transmission unit 201 of the charger base 200 will be described with reference to FIG. 3. Although FIG. 3 illustrates the principles of the power transmission-side, the above-described principles are basically equivalent to those of a configuration achieved to change a resonance frequency through the non-contact power reception unit 132 of the communication terminal device 100 illustrated in FIG. 1.

When performing the non-contact power transmission under the magnetic resonance scheme, the resonance frequency used on the power transmission-side should be equivalent to that used on the power reception-side. Each of an output unit provided on the power transmission-side and an input unit provided on the power reception-side that are configured to determine the resonance frequencies includes a capacitor connected in parallel with the circuit component corresponding to a coil.

Figure 3:
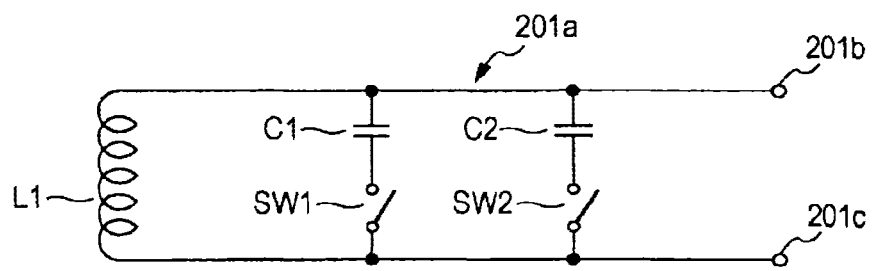
FIG. 3 is a circuit diagram illustrating an exemplary variable configuration of a resonance frequency according to an embodiment of the present invention.

Namely, a coil component L1 is connected in parallel with capacitors C1 and C2 as illustrated in FIG. 3. Each of ends 201b and 201c is provided to externally transmit transmission power therefrom, the transmission power being obtained in the non-contact power transmission unit 201.

Switches SW1 and SW2 are connected in series with the individual capacitors C1 and C2. Therefore, it is configured that the capacitor connected in parallel with the coil component L1 is changed based on the selection of the switches SW1 and SW2 for connection, and the resonance frequency determined in accordance with the coil and the capacitor is changed based on a change in the capacitance value of the changed capacitor.

The closing and opening of each of the switches SW1 and SW2 are controlled through the non-contact power transmission-control unit 202. According to a simple configuration illustrated in FIG. 3, for example, the switch SW1 is closed to set a first resonance frequency f1 (a first channel) and the switch SW2 is closed to set a second resonance frequency f2 (a second channel). When performing processing to change the resonance frequency in a single slot cycle that will be described later, the closing and opening of each of the switches SW1 and SW2 are repeated on a slot cycle.

On the other hand, in the non-contact power reception unit 132 provided on the communication terminal device 100-side which is the reception side, one of resonance frequencies is selected and determined for the power reception and the power reception is performed through the set resonance frequency (the first channel and/or the second channel) and the resonance frequency is not changed on a regular basis even though the resonance frequency is changed on the regular basis on the power transmission-side. However, the resonance frequency used for the power reception is a frequency (channel) specified through the near-field wireless communications that are performed on the charger base 200-side. Each of the resonance frequencies will be described as a channel at the time of discussing the flowchart of FIG. 4 later on.

Here, a circuit configuration including the coil, the capacitors, and the switches, which is illustrated in FIG. 3, is illustrated to describe the principles for changing a resonance frequency. Therefore, the configuration of each of an actual power transmission-output unit and/or an actual power reception-input unit may be different from that illustrated in FIG. 3.

3. Exemplary Processing Performed to Transfer Power to Terminal Device

Next, exemplary processing performed to transfer power from the charger base 200 to the communication terminal device 100 in a non-contact manner will be described with reference to the flowchart of FIG. 4.

There are two types of users owning the individual communication terminal devices 100 according to the above-descried embodiment. The two types of users include a user who had been registered as a member, that is, a user who had earned membership to the service of a store where the charger base 200 is provided and a user who had not been registered as a member. Data of the membership registration is stored in the member database 300 and the control unit 230 of the charger base 200 reads the data stored in the member database 300. Then, the read data is verified against data obtained by communicating with the terminal device 100. Consequently, it is determined whether or not each of the users owning the individual terminal devices 100 had been registered as a member.

Figure 4:
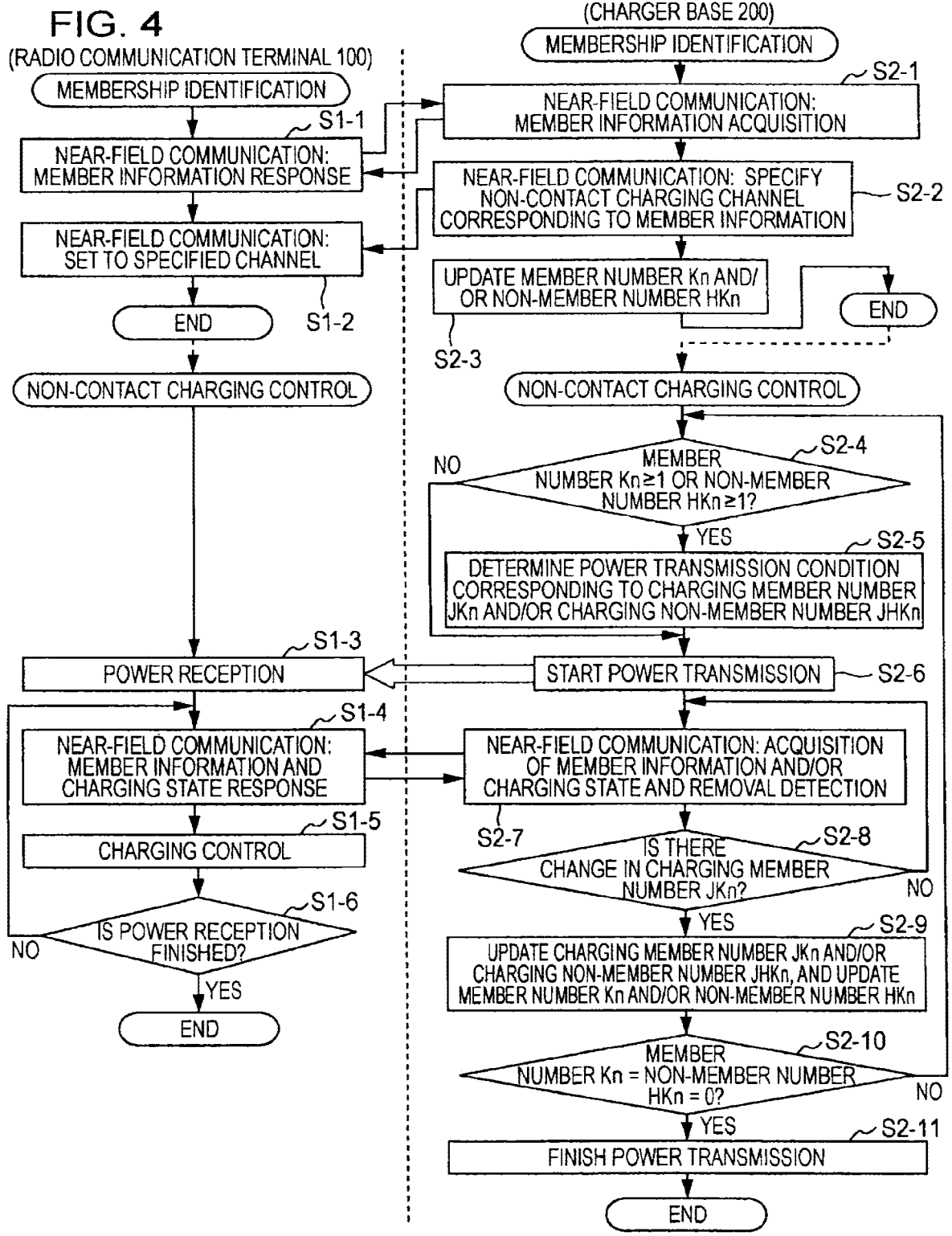
FIG. 4 is a flowchart illustrating exemplary power transfer processing performed according to an embodiment of the present invention.

In the flowchart of FIG. 4, the processing procedures corresponding to steps S1-1, S1-2, S1-3, S1-4, S1-5, and S1-6 that are illustrated on the left side are performed through the communication terminal device 100 provided on the power reception-side. The processing procedures corresponding to steps S2-1, S2-2, S2-3, S2-4, S2-5, S2-6, S2-7, S2-8, S2-9, S2-10, and S2-11 that are illustrated on the right side are performed through the charger base 200 provided on the power transmission-side.

First, the communication terminal device 100 is brought near to the charger base 200 so that wireless communications are established between the near-field wireless communication unit 111 of the communication terminal device 100 and the near-field wireless communication unit 212 of the charger base 200 at steps S1-1 and S2-1. The above-described wireless communications allow the charger base 200 to make a request to acquire the member information and the communication terminal device 100 to respond to the request and notify the charger base 200 of the member information.

The control unit 230 of the charger base 200 verifies the notified member information indicating whether or not the user had been registered as a member against the data stored in the member database 300 for confirmation.

Then, the control unit 230 of the charger base 200 notifies the communication terminal device 100 of the non-contact transfer (charging) channel corresponding to the confirmed member information through the near-field wireless communications at step S2-2. In the communication terminal device 100, a frequency provided for the non-contact power reception unit 132 to receive power is set to the notified channel at step S1-2.

On the other hand, in the charger base 200, data of the current number of the communication terminal devices 100 that are provided near the charger base 200 is updated based on the confirmed member information acquired from the communication terminal device 100 at step S2-3. Here, data of the number of terminal devices of members, which is indicated by the sign Kn, and the number of terminal devices of non-members, which is indicated by the sign HKn, is updated, where the sign n indicates the number of terminal devices of the members and/or the non-members.

When the registration information-confirmation that has hitherto been described is finished, non-contact power transmission is started for charging. First, it is determined whether or not either the current member number Kn or the non-member number HKn is at least one on the charger base 200-side at step S2-4. If one of the current member number Kn or the non-member number HKn is at least one, the power transmission conditions are set based on the current number of terminal devices of members, the terminal devices being charged, which is indicated by the sign JKn, and the current number of terminal devices of non-members, the terminal devices being charged, which is indicated by the sign JHKn, at step S2-5. Specific examples of the power transmission conditions that are determined based on the number of the terminal devices of the members JKn and that of the terminal devices of the non-members JHKn will be described later as the description of FIG. 7. It is configured that a relatively large amount of power is transmitted to the terminal device of a member and a relatively small amount of power is transmitted to that of a non-member.

Then, the non-contact power transmission unit 201 of the charger base 200 starts transmitting power under the set conditions at step S2-6. The transmitted power is received on the side of the communication terminal device 100 provided near the charger base 200 at step S1-3.

After that, wireless communications are established as appropriate between the near-field wireless communication unit 111 of the communication terminal device 100 and the near-field wireless communication unit 212 of the charger base 200 so that the near-field wireless communication unit 111 and the near-field wireless communication unit 212 can confirm the existence of each other. Namely, the charger base 200 monitors an increase and/or a decrease in the number of the terminal devices at step S2-7 and determines whether or not the number of at least one terminal device transmitting power is changed at step S2-8. When there is no change in the number of the terminal devices transmitting power, the processing returns to the monitoring performed at step S2-7.

The monitoring is also performed on the communication terminal device 100-side to perceive whether or not there is a change in the transfer state of the power supply (charging state) at step S1-4, and control is performed to charge the secondary battery 142 through the power supply which had received power at step S1-5. Then, it is determined whether or not the power reception is finished at step S1-6 and the processing is repeated until the power reception is finished.

Further, when it is determined that the number of the terminal devices transmitting power is changed at step S2-8 through the battery base 200, the changed number of the terminal devices of the members, the terminal devices being charged, which is indicated by the sign JKn, and the number of the terminal devices of the non-members, which is indicated by the sign JHKn, are updated at step S2-9. Further, the charging conditions are changed to the charging conditions corresponding to the update and the processing returns to step S2-7. Then, it is determined whether or not each of the updated terminal device number of the members and that of the non-members is zero at step S2-10. When each of the updated terminal device number of the members and that of the non-members becomes zero, the power transmission is finished at step S2-11.

Figure 5:
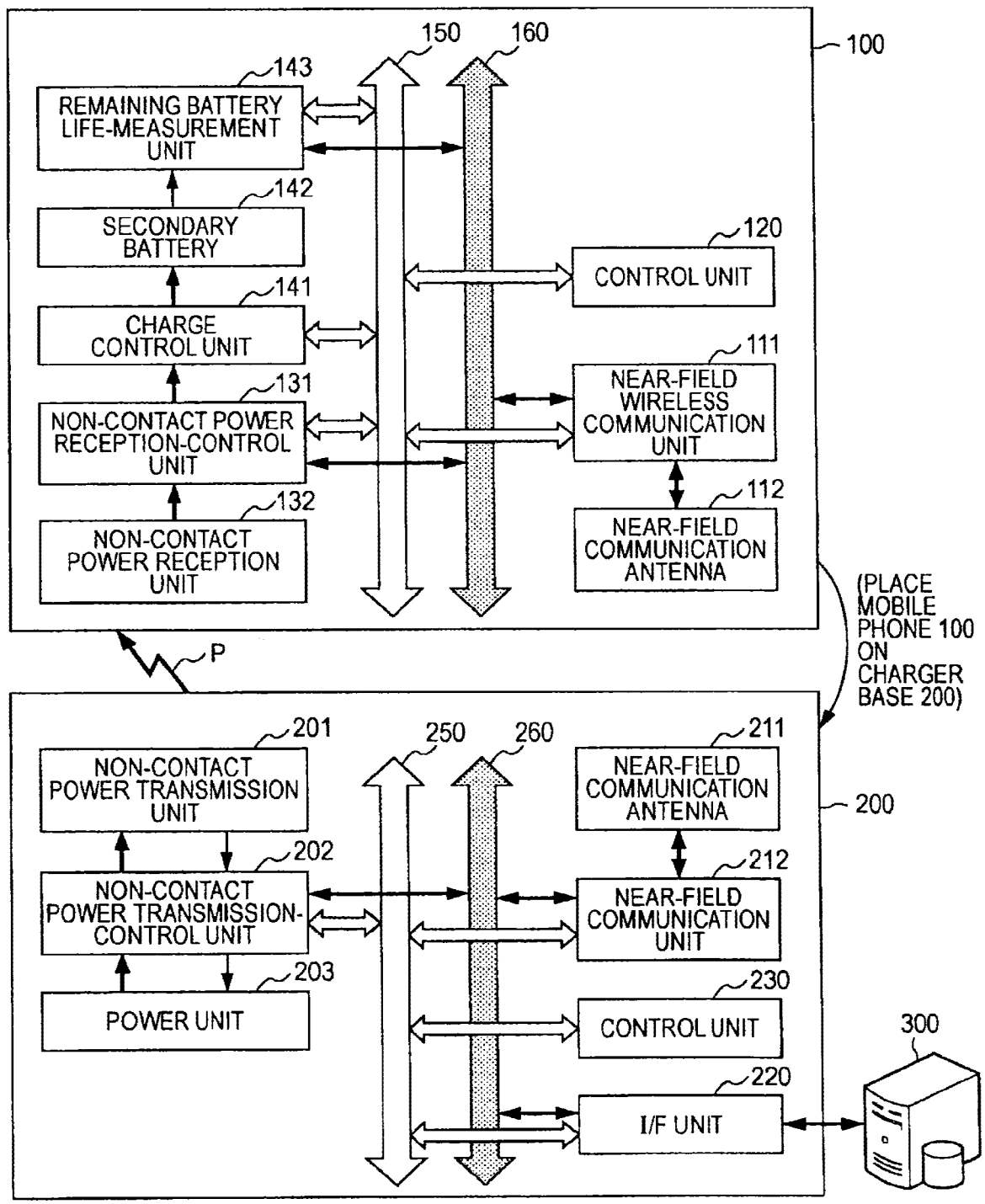
FIG. 5 illustrates a power transfer state achieved according to an embodiment of the present invention.

FIG. 5 illustrates an exemplary charging state attained when the communication terminal device 100 is provided near the charger base 200. As illustrated in FIG. 5, the communication terminal device 100 is provided on the charger base 200, for example. Consequently, wireless communications are established between both the near-field wireless communication unit 111 and 212 so that power is transferred from the non-contact power transmission unit 201 to the non-contact power reception unit 132 in a non-contact manner and the secondary battery 142 is charged.

Figure 6:
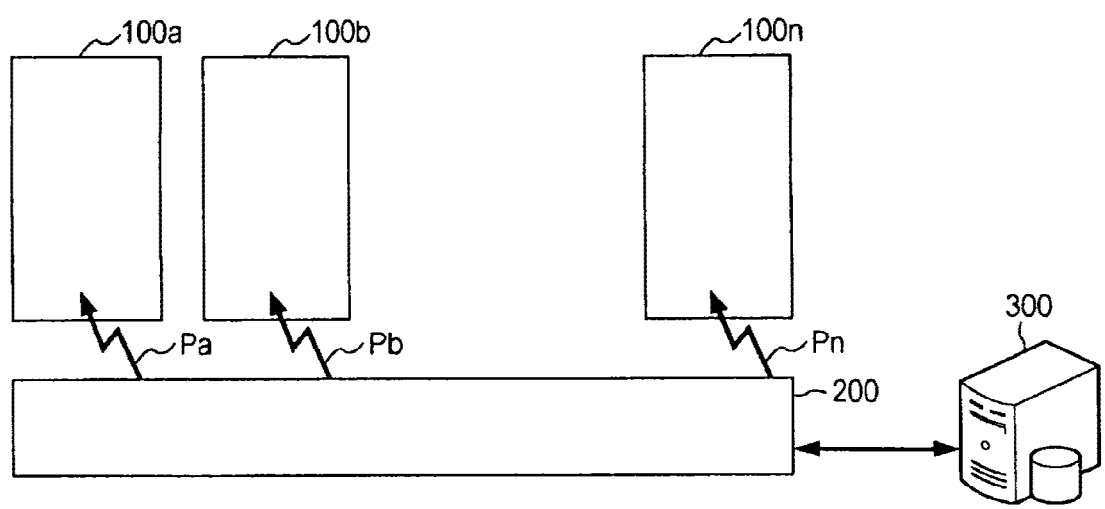
FIG. 6 illustrates an exemplary state of transferring power to a plurality of terminal devices according to an embodiment of the present invention.

FIG. 6 illustrates that a plurality of communication terminal devices 100*a*, 100*b*, . . . , and 100*n* is brought near to the charger base 200, where the sign n indicates an arbitrary integer, so that non-contact power transfers Pa, Pb, . . . , and Pn are performed for the individual communication terminal devices 100*a* to 100*n*. Thus, the power transmission processing performed to transfer power from the charger base 200 to the communication terminal devices 100*a* to 100*n* is executed through the single non-contact power transmission unit 201 illustrated in FIG. 2, which means that the single power transmission coil illustrated in FIG. 3 is provided.

Each of FIGS. 7A, 7B, 7C, and 7D illustrates an example where power is transmitted from the single charger base 200 to each of the communication terminal devices 100 according to the above-described embodiment.

Figure 7A:
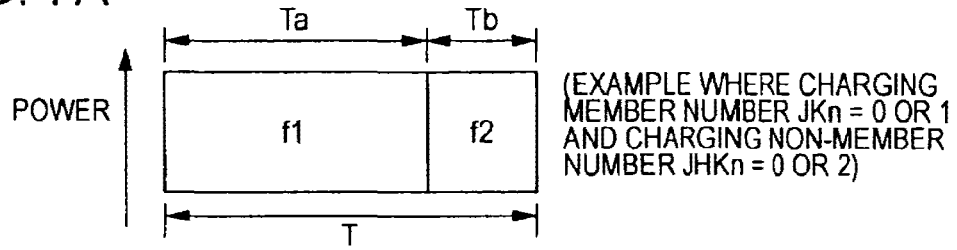
FIG. 7A illustrates an exemplary setting of transferring power to each of terminal devices according to an embodiment of the present invention.

FIG. 7A illustrates a slot configuration provided to perform the power transmission. As illustrated in FIG. 7A, a single unit slot is set to perform the power transmission. The single unit slot is the slot of a determined length (time). For example, the single unit slot is determined to be a fixed time of the order of a few tens of seconds to a single minute. Then, the single slot period is divided in two time periods including a power transmission time period Ta for a member and a power transmission time period Tb for a non-member. However, the power transmission time period Ta for the member and the power transmission time period Tb for the non-member are not in a ratio of five to five. Namely, the power transmission time period Ta for the member is longer than the power transmission time period Tb for the non-member.

In the power transmission time period Ta for the member, the channel of the resonance frequency f1 is set to perform the power transfer. In the power transmission time period Tb for the non-member, the channel of the resonance frequency f2 is set to perform the power transfer.

In the power transmission time period Ta for the member, the transmission power amount is variable based on the number of at least one communication terminal device of the members for the power transmission. On the other hand, in the power transmission time period Tb for the non-member, the transmission power amount is fixed when the communication terminal device-number of the non-member for the power transmission is at least one.

A unit slot T illustrated in FIG. 7A is repeated under the same conditions until the communication terminal device-number is changed.

Figure 7B:
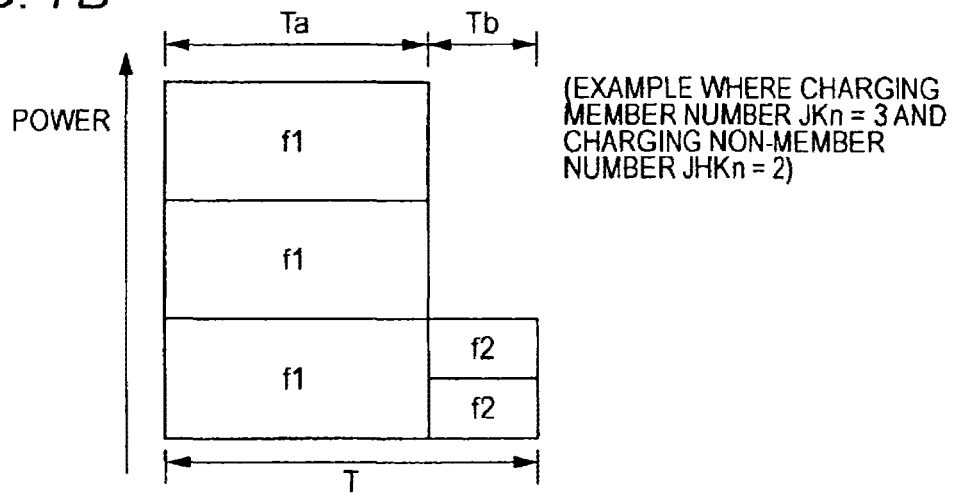
FIG. 7B illustrates another exemplary setting of transferring the power to each of the terminal devices according to an embodiment of the present invention.

A specific example of the communication terminal device-number will be described. For example, the power transmission is performed for three communication terminal devices of the members (JK3) and two communication terminal devices of the non-members (JHK2) as illustrated in FIG. 7B. In that case, in the member-power transmission-time period Ta, power which is three times as large as that transmitted to a single communication terminal device is transmitted over the channel of the resonance frequency f1. The vertical axis illustrated in FIG. 7B indicates power. Therefore, the communication terminal device 100 of each of the members receives power which is approximately equivalent to that transmitted to a single communication terminal device for charging. Namely, the above-described communication terminal device 100 can receive a relatively large amount of power and the secondary battery is charged in a relatively short time period through the use of a large amount of power which is almost constant at all times.

On the other hand, in a non-member power transmission time period Tb, power which is the same as that transmitted to a single communication terminal device is transmitted over the channel of the resonance frequency f2. Namely, each of two communication terminal devices 100 of the non-members receives power which is reduced by half or so. Consequently, the secondary battery is charged through the use of a relatively small amount of power.

Figure 7C:
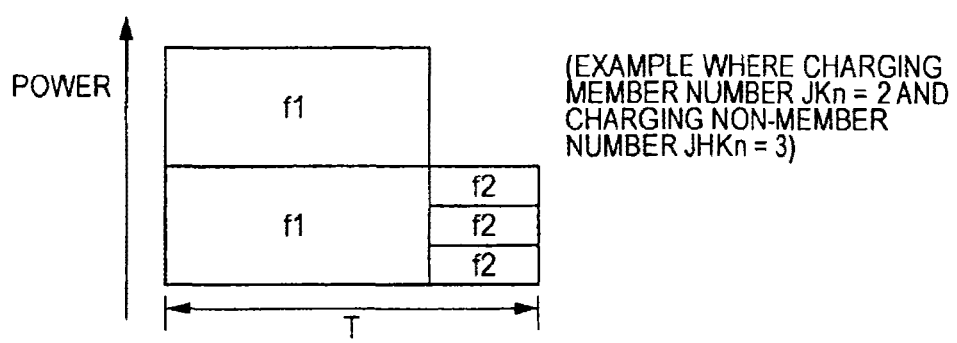
FIG. 7C illustrates another exemplary setting of transferring the power to each of the terminal devices according to an embodiment of the present invention.

In FIG. 7C, the number of the communication terminal devices 100 of the members becomes two which is smaller than in the case of FIG. 7B by as much as one, and the number of the communication terminal devices 100 of the non-members becomes three which is larger than in the case of FIG. 7B by as much as one.

A comparison of FIG. 7B and FIG. 7C indicates that the transmission power is reduced correspondingly in the member-power transmission time period Ta and the transmission power is not changed in the non-member-power transmission time period Tb. Consequently, the reception power of the communication terminal device 100 of a member is not changed while that of the communication terminal device 100 of a non-member is reduced correspondingly.

Thus, the transmission power provided for a member differs from that provided for a non-member so that power for the minimum charging is transmitted to the non-member and power which is almost constant at all times is transmitted to the member for charging. Consequently, it becomes possible to perform the power transfer with efficiency while giving preferential treatment to the terminal device of a registered member.

In the example illustrated in FIG. 7B and/or FIG. 7C, the total amount of transmission power is not changed in the non-member power transmission time period Tb. However, the above-described total amount may be changed based on the number of non-members.

In the above-described embodiment, the amount of transmission power is increased with an increase in the number of members, for example. However, if it is difficult to increase the transmission power, the ratio of the member-power transmission-time period to the non-member-power transmission-time period within the slot may be changed.

Figure 7D:
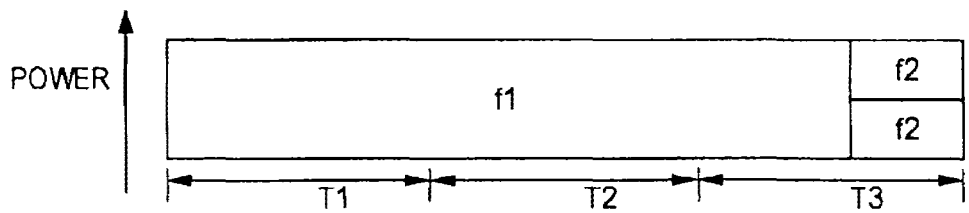
FIG. 7D illustrates another exemplary setting of transferring the power to each of the terminal devices according to an embodiment of the present invention.
Figure 8:
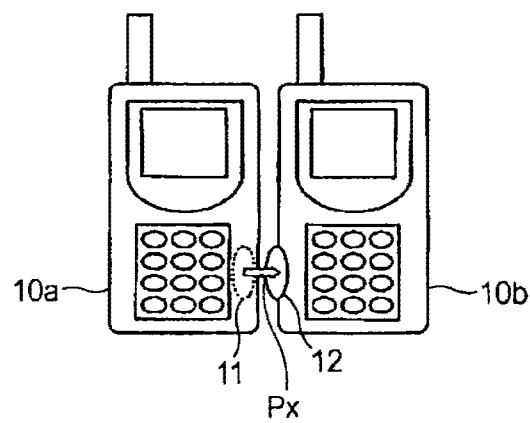
FIG. 8 illustrates exemplary power transfer performed under an electromagnetic induction scheme of related art.
Figure 9:
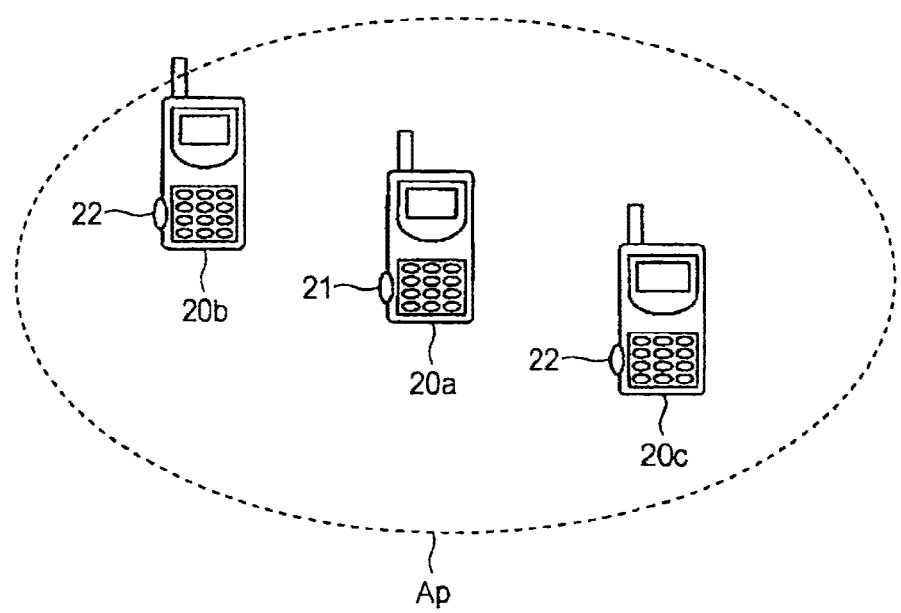
FIG. 9 illustrates exemplary power transfer performed under a magnetic resonance scheme of related art.

That is to say, as illustrated in FIG. 7D, it may be configured that the transmission power is fixed at all times and each of first and second unit slots is determined to be the power transmission time period of the frequency f1 of a member and the transmission power time period of the frequency f2 of a non-member is provided at the last of a third unit slot. The above-described configuration also allows for increasing the transmission power for a member and decreasing the transmission power for a non-member in the event. Consequently, it becomes possible to perform charging processing while giving preferential treatment to the member.

Although the example illustrated in FIG. 7D indicates that the member-side slot period is changed, the slot period provided for a non-member may be increased and/or decreased, for example. Further, a link may be established between the change in the member-slot period and that in the non-member-slot period.

4. Exemplary Modifications

Each of FIGS. 7A to 7D exemplarily illustrates the power setting performed for a member and that performed for a non-member. Namely, different processing may be performed so long as the power transfer is performed while giving preferential treatment to a member.

Further, according to the processing procedures that are illustrated in the flowchart of FIG. 4, an instruction is issued to set each of the resonance frequency f1 provided for a member and the resonance frequency f2 provided for a non-member. However, in each of the communication terminal devices 100, the power reception unit may be provided with the resonance frequency f2 as an initial value so that the resonance frequency is changed to the resonance frequency f1 only when instruction data is transmitted from the charger base 200 to the communication terminal device 100.

Further, if many resonance frequencies can be set on the communication terminal device 100-side, a resonance frequency allowing the high-power transmission may be allotted based on the current availability of resonance frequencies on the charger base 200-side.

Further, in the above-described embodiment, the power transmission state is exemplarily changed in two steps, that is, the member processing and the non-member processing. However, the power transmission state may be changed based on the status of each of the members. That is to say, the power transmission state may be changed based on the high/low status of a member.

Further, in the above-described embodiment, the charging priority is changed based on whether or not a user is registered as a member of some kind. However, the charging priority may be changed based on different conditions of a terminal device. For example, the charging priority may be changed based on the registration fee, the monthly usage charge, etc. of a terminal device.

Otherwise, it may be configured that the reception of minimum transmitted power is provided free and a terminal device for which the charging fee had been paid is charged through the use of the power corresponding to the charging fee.

It should be understood by those skilled in the art that various modifications, combinations, sub-combinations and alterations may occur depending on design requirements and other factors insofar as they are within the scope of the appended claims or the equivalents thereof.

What is claimed is:

1. A power supply apparatus comprising:
a wireless communication interface configured to receive identification information from each of a plurality of communication terminal devices, wherein the identification information indicates whether each communication terminal device in the plurality of communication terminal devices is associated with a membership at a location where the power supply apparatus is provided; and
circuitry configured to determine a level of power that is transmitted in a non-contact manner to each of the communication terminal devices based on the identification information received via the wireless communication interface.

2. The power supply apparatus of claim 1, wherein
the circuitry is configured to determine whether each of the communication terminal devices belong to a first priority level or a second priority level based on the identification information received from each of the terminals via the wireless communication interface.

3. The power supply apparatus of claim 2, wherein
the circuitry is configured to determine the level of power that is transmitted in a non-contact manner to each of the plurality of terminals based on a number of communication terminal devices belonging to the first priority level and a number of communication terminal devices belonging to the second priority level.

4. The power supply apparatus of claim 2, wherein
the circuitry is configured to set a first resonance frequency to transfer power in a non-contact manner to communication terminal devices belonging to the first priority level and a second resonance frequency for communication terminal devices belonging to the second priority level.

5. The power supply apparatus of claim 4, wherein
the circuitry is configured to control transmitting power at the first resonance frequency for a first period of time over a predetermined period of time and transmitting power at the second resonance frequency for a second period of time over the predetermined period of time, the first period of time being longer than the second period of time.

6. The power supply apparatus of claim 4, wherein
the circuitry is configured to control transmitting power at the first resonance frequency at a first power level and transmitting power at the second resonance frequency at a second power level, the first power level being higher than the second power level.

7. The power supply apparatus of claim 4, wherein
the circuitry is configured to control transmitting power at the first resonance frequency at a first power level for a first period of time over a predetermined period of time and transmitting power at the second resonance frequency at a second power level for a second period of time over the predetermined period of time, the first power level being higher than the second power level and the first period of time being longer than the second period of time.

8. The power supply apparatus of claim 2, wherein
the circuitry is configured to set a first power level to transfer power in a non-contact manner to communication terminal devices belonging to the first priority level and a second power level to transfer power in a non-contact manner to communication terminal devices belonging to the second priority level, the first power level being higher than the second power level.

9. The power supply apparatus of claim 1, wherein
the circuitry is configured to set a resonance frequency to transfer power in a non-contact manner to each of the communication terminal devices based on the received identification information.

10. The power supply apparatus of claim 9, wherein
the circuitry is configured to control the wireless communication interface to transmit information indicating the resonance frequency set for each of the communication terminal devices to each of the communication terminal devices.

11. The power supply apparatus of claim 1, wherein
the circuitry is configured to set a first power level to transfer power in a non-contact manner to a first of the communication terminal devices and a second power level to transfer power in a non-contact manner to a second of the communication terminal devices, the first power level being higher than the second power level.

12. A wireless power transmission method performed by a power supply apparatus, the method comprising:
receiving identification information from each of a plurality of communication terminal devices via wireless communication, wherein the identification information indicates whether each communication terminal device in the plurality of communication terminal devices is associated with a membership at a location where the power supply apparatus is provided; and
determining a level of power that is transmitted in a non-contact manner to each of the communication terminal devices based on the identification information received via the wireless communication interface.

13. The method of claim 12, further comprising:
setting a first power level to transfer power in a non-contact manner to a first of the communication terminal devices and a second power level to transfer power in a non-contact manner to a second of the communication terminal devices, the first power level being higher than the second power level.

14. The method of claim 12, further comprising:
determining whether each of the communication terminal devices belong to a first priority level or a second priority level based on the identification information received from each of the terminals via the wireless communication interface.

15. The method of claim 14, further comprising:
setting a first power level to transfer power in a non-contact manner to communication terminal devices belonging to the first priority level and a second power level to transfer power in a non-contact manner to communication terminal devices belonging to the second priority level, the first power level being higher than the second power level.

16. A non-transitory computer readable medium including computer program instructions, which when executed by a power supply apparatus, cause the power supply apparatus to:
receive identification information from each of a plurality of communication terminal devices via wireless communication, wherein the identification information indicates whether a communication terminal device in the plurality of communication terminal devices is associated with a membership at a location where the power supply apparatus is provided; and
determine a level of power that is transmitted in a non-contact manner to each of the communication terminal devices based on the identification information received via the wireless communication interface.

17. The non-transitory computer readable medium of claim 16, wherein the computer program instructions further cause the power supply apparatus to:
set a first power level to transfer power in a non-contact manner to a first of the communication terminal devices and a second power level to transfer power in a non-contact manner to a second of the communication terminal devices, the first power level being higher than the second power level.

18. The non-transitory computer readable medium of claim 16, wherein the computer program instructions further cause the power supply apparatus to:
determine whether each of the communication terminal devices belong to a first priority level or a second priority level based on the identification information received from each of the terminals via the wireless communication interface.

19. The non-transitory computer readable medium of claim 18, wherein the computer program instructions further cause the power supply apparatus to:
set a first power level to transfer power in a non-contact manner to communication terminal devices belonging to the first priority level and a second power level to transfer power in a non-contact manner to communication terminal devices belonging to the second priority level, the first power level being higher than the second power level.

* * * * *